US012604126B2

(12) United States Patent
Doi et al.

(10) Patent No.: US 12,604,126 B2
(45) Date of Patent: Apr. 14, 2026

(54) VEHICULAR MICROPHONE AND VEHICLE

(71) Applicant: Panasonic Intellectual Property Management Co., Ltd., Osaka (JP)

(72) Inventors: Kazumoto Doi, Kanagawa (JP); Yoshimichi Ooya, Fukushima (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 176 days.

(21) Appl. No.: 18/436,924

(22) Filed: Feb. 8, 2024

(65) Prior Publication Data

US 2024/0292140 A1 Aug. 29, 2024

(30) Foreign Application Priority Data

Feb. 27, 2023 (JP) ................................ 2023-028323

(51) Int. Cl.
*H04R 1/02* (2006.01)
*H04R 1/08* (2006.01)

(52) U.S. Cl.
CPC ............... *H04R 1/086* (2013.01); *H04R 1/02* (2013.01); *H04R 2499/13* (2013.01)

(58) Field of Classification Search
CPC .............................. H04R 2499/13; H04R 1/02
USPC .................................................. 381/86, 122
See application file for complete search history.

(56) References Cited

U.S. PATENT DOCUMENTS

2021/0107412 A1* 4/2021 Wang .................. B60R 11/0205

FOREIGN PATENT DOCUMENTS

CN 110418228 B 5/2021
WO 2020127408 A1 6/2020

* cited by examiner

*Primary Examiner* — George C Monikang
(74) *Attorney, Agent, or Firm* — Seed Intellectual Property Law Group LLP

(57) ABSTRACT

A vehicular microphone includes: at least one microphone sensor that detects sound; a board that includes a first surface and a second surface, the first surface being a surface where the microphone sensor is provided, the second surface being opposite to the first surface; a cover that includes a bottom surface and a side surface; and a connector that is electrically connectable to a cable of a vehicle, wherein, the cover is provided with at least one first hole that opens toward the bottom surface of the cover to collect the sound to be detected by the microphone sensor.

13 Claims, 5 Drawing Sheets

VEHICULAR MICROPHONE AND VEHICLE

BACKGROUND

Technical Field

The present disclosure relates to a vehicular microphone placed on a vehicle body, and a vehicle.

Description of the Related Art

A microphone that is placed outside of a vehicle and converts received sounds outside the vehicle to electrical signals has been used recently. A commonly used microphone has a problem of susceptibility to dirt, dust, water, etc. from outside of the vehicle.

To address such a problem, a protective film provided under a protective cap prevents water and foreign objects from getting into a microphone unit, in Patent Literature (hereinafter, referred to as PTL) 1 (WO 2020/127408). In PTL 2 (China Patent Application Publication No. 110418228), water is removed from the inside of a microphone by water boiling and gas expansion using a heater.

BRIEF SUMMARY

The technique of PTL 1, however, has such a problem that water and a foreign object got into a space between the protective cap and the protective film stays on the protective film, a vibration characteristic of the protective film when sound pressure is applied is changed, and the acoustic performance is significantly impaired, accordingly. The technique of PTL 2 has such a problem that it is difficult to miniaturize a microphone since a heater has to be provided.

The present disclosure is for addressing such problems and the object is to provide a vehicular microphone placed on a vehicle body, and a vehicle each capable of naturally removing water and a foreign object got into the microphone and miniaturizing the microphone.

To address the above problems, one aspect of a vehicular microphone according to the present disclosure includes: at least one microphone sensor that detects sound; a board that includes a first surface and a second surface, the first surface being a surface where the microphone sensor is provided, the second surface being opposite to the first surface; a cover that includes a bottom surface and a side surface; and a connector that is electrically connectable to a cable of a vehicle, wherein, the cover is provided with at least one first hole that opens toward the bottom surface of the cover to collect the sound to be detected by the microphone sensor.

Further, one aspect of a vehicle according to the present disclosure includes the vehicular microphone, wherein the vehicular microphone is installed so that the at least one first hole opens toward a lower side of a body of the vehicle.

According to the present disclosure, it is possible to naturally remove water and a foreign object got into a microphone and miniaturize the microphone.

DETAILED DESCRIPTION

Figure 1:
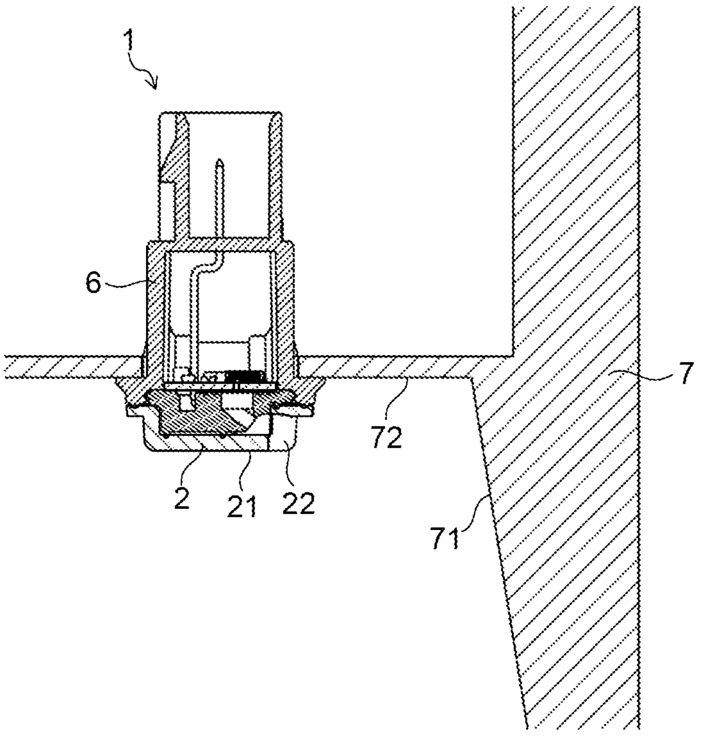
FIG. 1 is a cross-section view illustrating an exemplary configuration of a vehicular microphone attached to a vehicle body.

Hereinafter, embodiments of the present disclosure will be described in detail with reference to the accompanying drawings. Note that the embodiments described below are all specific examples of the present disclosure. Accordingly, the numerical values, the components, the arrangement of the components, the connection configuration, etc. in the following embodiments are merely examples, and it is not intended to limit the present disclosure. Thus, components not recited in the independent claims among the components in the following embodiments are described as optional components.

In addition, the drawings are schematic diagrams and not necessarily exactly illustrated. Note that substantially the same components are denoted by the same reference signs in the drawings, and redundant descriptions are omitted or simplified.

Figure 2:
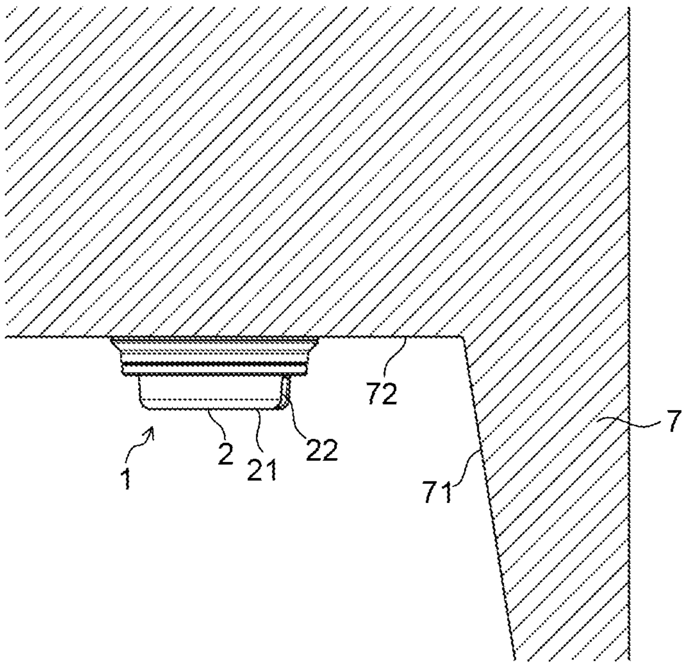
FIG. 2 illustrates an exemplary configuration of a cover of the vehicular microphone placed on the vehicle body.

First, a configuration of vehicular microphone 1 according to the embodiment will be described with reference to FIG. 1. FIG. 1 is a cross-section view illustrating an exemplary configuration of vehicular microphone 1 attached to vehicle body 7, and FIG. 2 illustrates an exemplary configuration of cover 2 of vehicular microphone 1 placed on vehicle body 7.

Vehicular microphone 1 is attached, for example, to surface 72 facing the ground at the rear of vehicle body 7. Bottom surface 21 of cover 2 of vehicular microphone 1 faces the ground. A portion of connector 6 of microphone 1 on the side of cover 2 is fixed to surface 72 of vehicle body 7 facing the ground. Connector 6 is placed inside of vehicle body 7, and cover 2 is placed outside of surface 72 of vehicle body 7 facing the ground.

First hole 22 is formed on the bottom surface of cover 2 to collect sound to be detected by a microphone sensor to be described later. It is thus possible to naturally remove water and a foreign object got into vehicular microphone 1 by placing vehicular microphone 1 so that first hole 22 opens downward from vehicle body 7. It is also possible to miniaturize vehicular microphone 1 since there is no need to provide a heater as in the prior art.

Further, first hole 22 is formed so as to open not only toward the bottom surface of cover 2 but also toward the side surface of cover 2. It is thus possible to prevent a foreign object such as water, mud, and dust splashed by a vehicle from getting into first hole 22 by placing vehicular microphone 1 so that first hole 22 opens toward side surface 71 of vehicle body 7.

Note that vehicular microphone 1 is not necessarily placed so that first hole 22 faces side surface 71 of vehicle body 7, but placing it in this way makes it possible to prevent water and a foreign object splashed by a vehicle from directly getting into first hole 22.

Further, vehicular microphone 1 is not necessarily placed on surface 72 and may be placed at the front of vehicle body 7, on the bottom surface of a bumper, on a side mirror, or the like.

Figure 3:
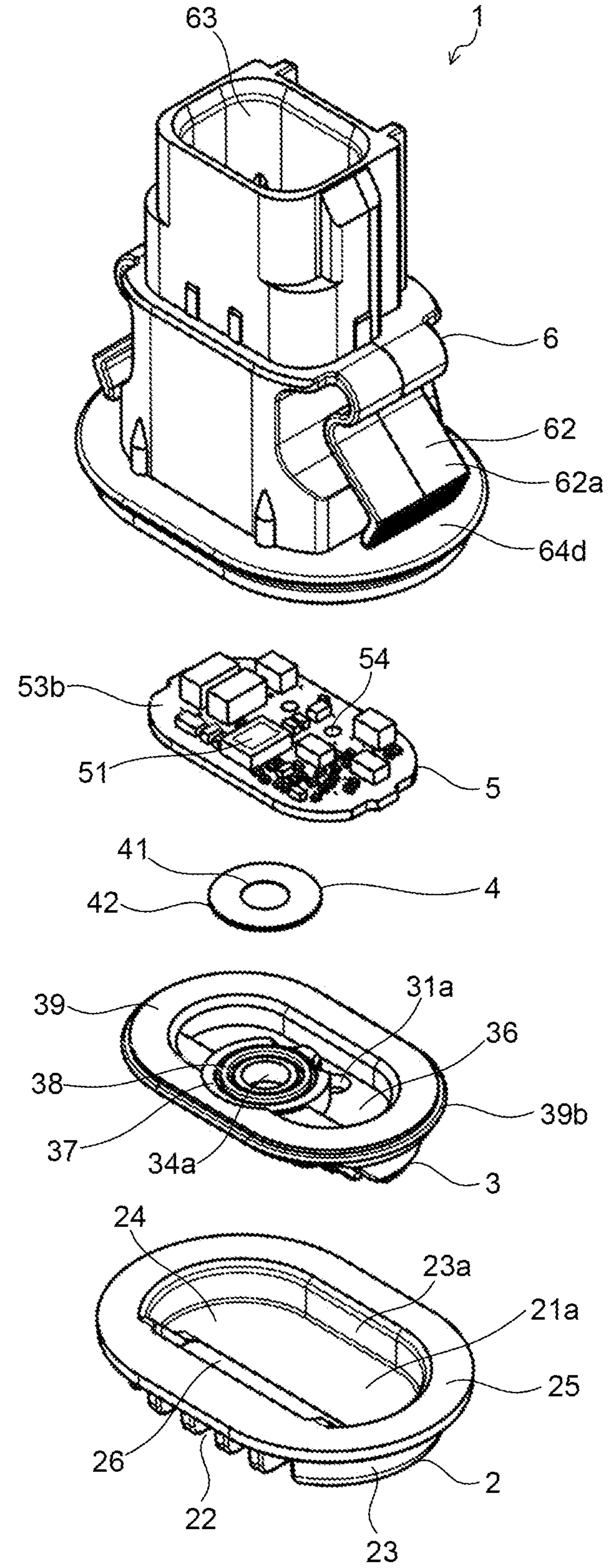
FIG. 3 is an exploded perspective view of the vehicular microphone according to the present embodiment viewed from above.
Figure 4:
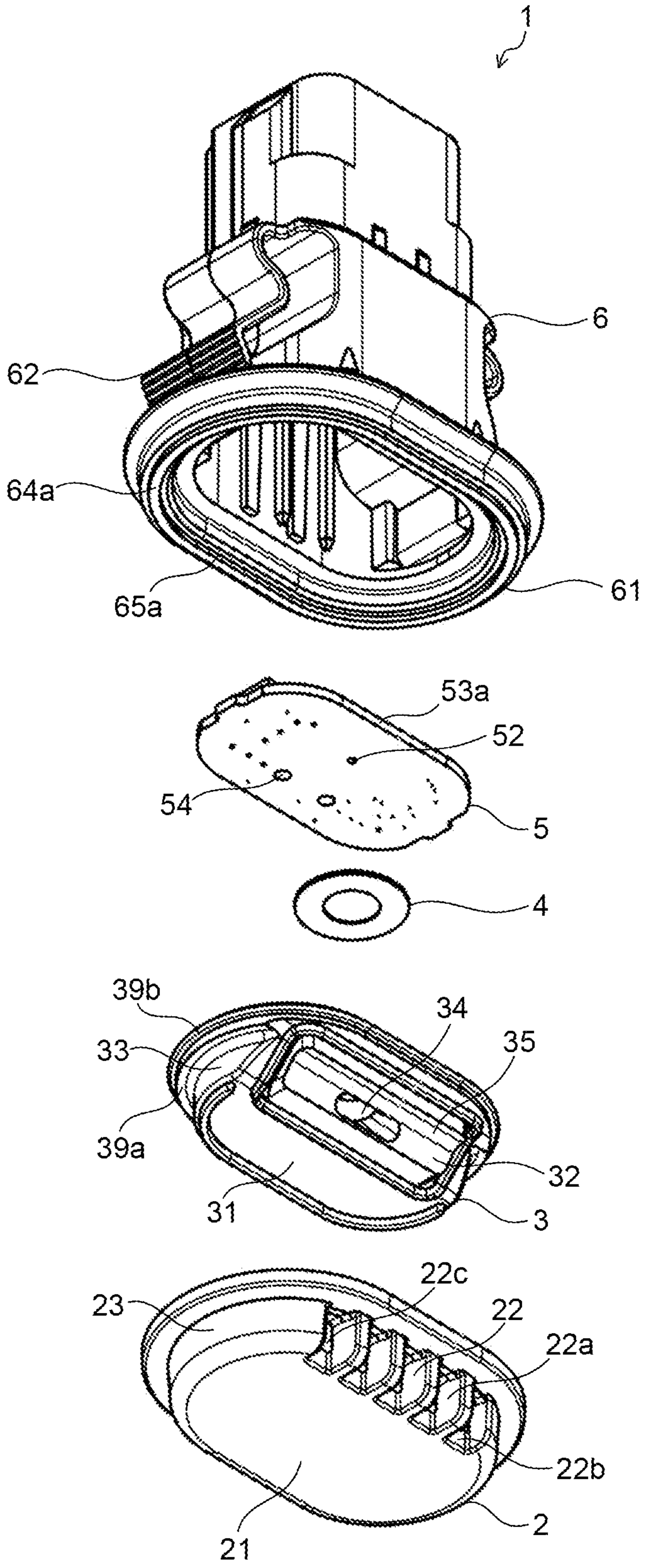
FIG. 4 is an exploded perspective view of the vehicular microphone according to the present embodiment viewed from below.

FIG. 3 is an exploded perspective view of vehicular microphone 1 according to the present embodiment viewed from above vehicle body 7. FIG. 4 is an exploded perspective view of vehicular microphone 1 according to the present embodiment viewed from below vehicle body 7. Vehicular microphone 1 includes cover 2, holder 3, waterproof film 4, board 5, and connector 6.

Figure 5A:
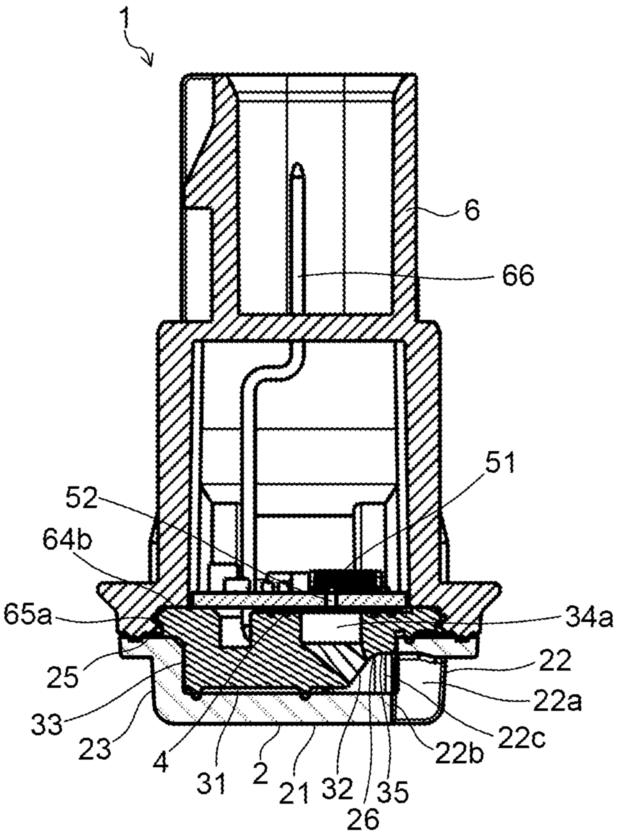
FIG. 5A is a cross-section view illustrating the vehicular microphone according to the present embodiment.
Figure 5B:
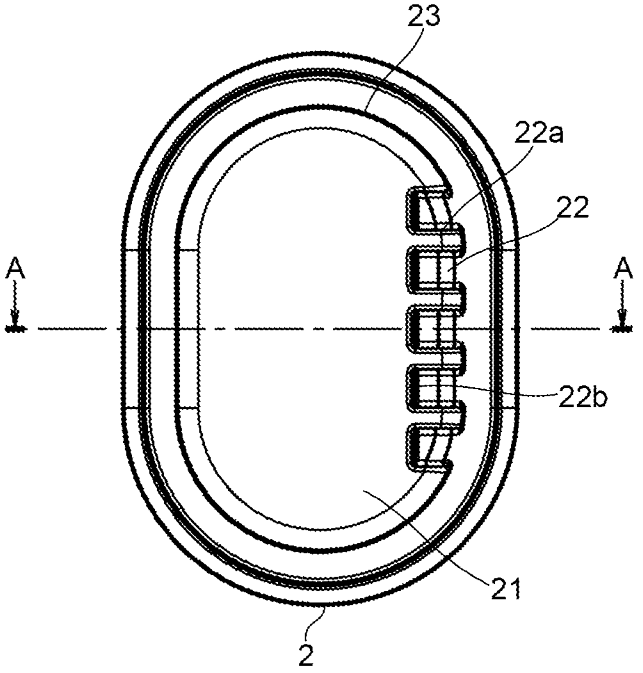
FIG. 5B is a bottom view illustrating the cover according to the present embodiment.
Figure 6A:
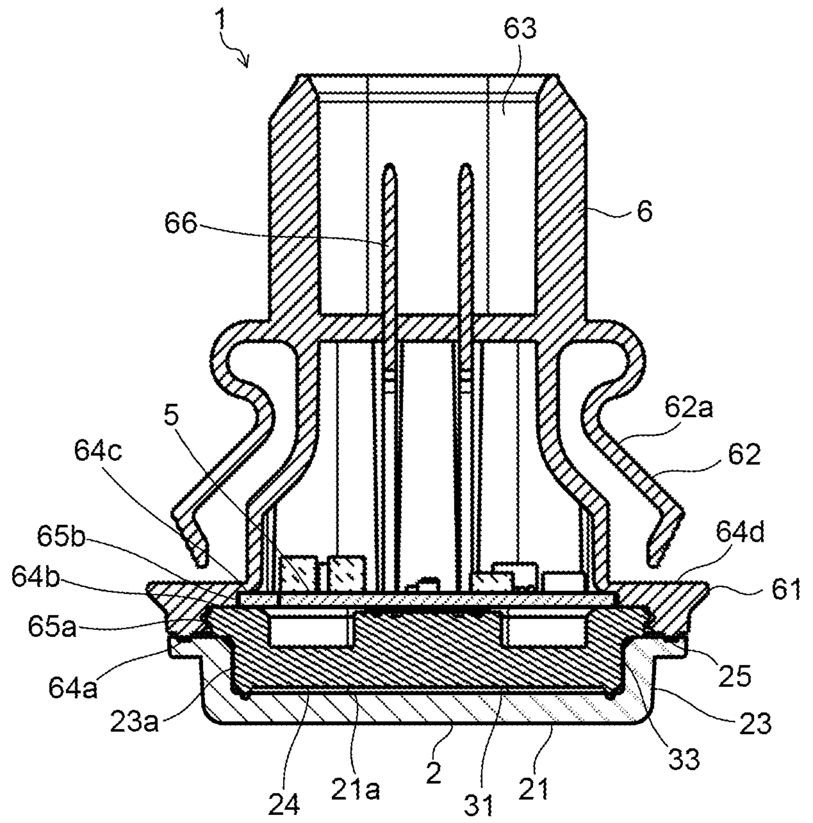
FIG. 6A is another cross-section view illustrating the vehicular microphone according to the present embodiment.
Figure 6B:
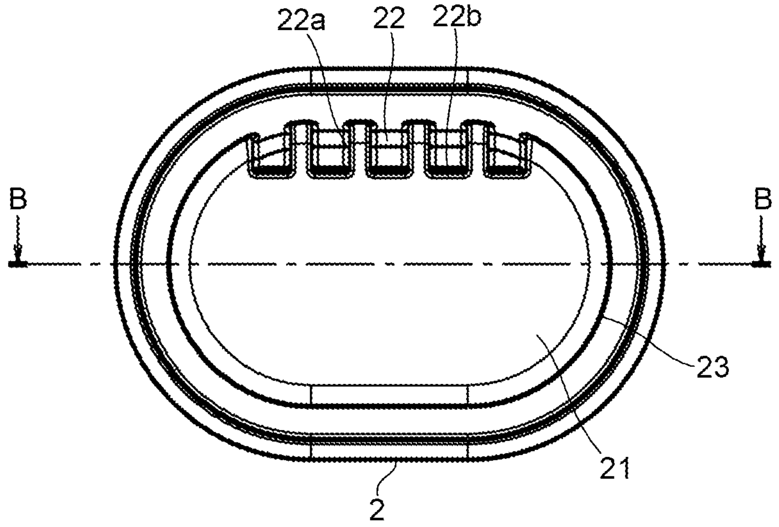
FIG. 6B is another bottom view illustrating the cover according to the present embodiment.

FIG. 5A and FIG. 6A are cross-section views of vehicular microphone 1 according to the present embodiment, and FIG. 5B and FIG. 6B are bottom views illustrating cover 2 according to the present embodiment. The cross-section view illustrated in FIG. 5A is a diagram of vehicular microphone 1 cut along the A-A line illustrated in FIG. 5B. The cross-section view illustrated in FIG. 6A is a diagram of vehicular microphone 1 cut along the B-B line illustrated in FIG. 6B.

Cover 2 includes elliptical bottom surface 21 and side surface 23, and five first holes 22 are formed in a substantially straight portion of side surface 23. First holes 22 are formed on bottom surface 21 of cover 2 so as to open in a direction perpendicular to bottom surface 21.

First holes 22 are also formed on side surface 23 of cover 2 so as to open in a direction perpendicular to side surface 23. To be more specific, first holes 22 are each defined by two side surfaces 22*a* and surface 22*b* perpendicular to respective side surfaces 22*a*, and are each formed so as to open outward of cover 2 perpendicular to surface 22*b*.

The effect of preventing ingress of water and a foreign object can be obtained even when first holes 22 of cover 2 are provided so as to open toward only bottom surface 21 or side surface 23, but by forming first holes 22 on both bottom surface 21 and side surface 23, first holes 22 are less likely to be filled with mud splashed directly from below the vehicle compared with a case where first holes 22 are provided so as to open toward only bottom surface 21.

Further, water and a foreign object are easily discharged from first holes 22 as compared with the case where first holes 22 are provided so as to open toward only bottom surface 21. In addition, the sound hole diameter can be increased, thereby improving the acoustic performance (frequency performance).

The reason why there are five first holes 22 is that, even when some of first holes 22 can no longer be used due to dust, mud, etc. filled therein, the rest of first holes 22 can still detect sound. Note that the number of first holes 22 is not limited to five and may be another number.

Cover 2 is formed with substantially elliptical concavity 24 defined by bottom surface 21*a* and side surface 23*a*. In addition, elliptical flange surface 25 larger than bottom surface 21 is formed on the upper portion of cover 2. Further, surface 26, which is a surface one step down from flange surface 25, is formed inside cover 2 on the first hole 22 side.

Holder 3 includes bottom surface 31, inclined surface 32, and side surface 33, and first opening 34 serving as a path of sound collected by first holes 22 is formed on inclined surface 32. First opening 34 has a rectangular shape with rounded corners. First opening 34 is formed at an angle to bottom surface 31 of holder 3 from inclined surface 32. Surface 35 in contact with surface 26 of cover 2 is formed on the upper side of inclined surface 32.

Bottom surface 31 of holder 3 has a substantially elliptical shape, and holder 3 has concavity 36 inside. Cylindrical sealing rib 37 is placed above first opening 34 of concavity 36, and sealing rib 37 is formed with cylindrical second opening 34*a* through which sound collected by first holes 22 passes. Second opening 34*a* of sealing rib 37 and first opening 34 formed on inclined surface 32 are communicated with each other.

Protrusion 38 is formed around second opening 34*a* of sealing rib 37. Further, annular waterproof film 4 including second hole 41 through which sound collected by first holes 22 passes is placed at the upper portion of protrusion 38. Substantially elliptical flange surface 39 larger than bottom surface 31 is formed on the upper portion of side surface 33 of holder 3.

Bottom surface 31 and side surface 33 of holder 3 are fixed to concavity 24 of cover 2. Surface 35 of holder 3 is in contact with surface 26 of cover 2, and second opening 34*a* of holder 3 are communicated with first holes 22 of cover 2. Further, back side 39*a* of surface 39 of holder 3 is in contact with surface 25 of cover 2, and is joined by, for example, laser-welding.

The diameter of second hole 41 of waterproof film 4 is substantially the same as the diameter of the circle of second opening 34*a*. The diameter of annular part 42 of waterproof film 4 is substantially the same as the diameter of sealing rib 37.

Other electronic components, circuits, and the like are mounted on the front surface of board 5, and microphone sensor 51 is mounted above second opening 34*a*. On board 5, cylindrical third hole 52 for allowing sound to pass is formed in a position where microphone sensor 51 is placed. Board 5 has a rectangular shape and is formed so as to have rounded corners.

Board 5 is placed on surface 39 of holder 3, and the center of third hole 52 of board 5 coincides with the center of second opening 34*a* of holder 3 and the center of second hole 41 of waterproof film 4.

As illustrated in FIG. 4 and FIG. 5A, sound collected by first holes 22 passes through first opening 34, second opening 34*a*, and third hole 52, and reaches microphone sensor 51. Here, first opening 34 is formed in a straight line at an oblique direction to bottom surface 21 of cover 2 provided with first holes 22.

Forming the sound path straight as described above makes it possible to shorten the length of the path through which the sound passes as compared with a case where the sound path is stepped or curved, thereby improving the acoustic performance (frequency performance).

In addition, waterproof film 4 placed between holder 3 and board 5 prevents water and a foreign object from reaching microphone sensor 51 even if water and the foreign object reach third hole 52 of board 5; accordingly, microphone sensor 51 can be prevented from being destroyed by water and the foreign object.

Holder 3 including protrusion 38 is formed of an elastic body such as rubber or a soft material. Waterproof film 4 is formed of polytetrafluoroethylene (PTFE) or the like. When board 5 is held by holder 3, protrusion 38 is pressed and deformed by the pressure from board 5.

This reliably closes the space between holder 3 and board 5, thereby preventing water leakage and sound leakage that leads to deterioration of an acoustic characteristic. Further, even if rushing water gets into vehicular microphone 1, the waterproof film is less likely to peel off.

Note that waterproof film 4 is not necessarily formed of these materials, and other materials may be used. Alternatively, waterproof film 4 may be adhered to sealing rib 37 of holder 3 and board 5 by double-sided tape. Using sealing rib 37 as described above, however, reduces the number of manufacturing steps, and vehicular microphone 1 can be manufactured at a lower cost.

Connector 6 includes fixer 61, supporter 62, and storage 63. Fixer 61 is formed at a lower portion of connector 6, and fixes cover 2, holder 3, and board 5 with respect to connector 6. This seals between connector 6 and cover 2. Connector 6 is electrically connected to a cable that is a part of a vehicle.

Fixer 61 has elliptical bottom surface 64*a*, and bottom surface 64*a* fixes surface 25 of cover 2. In addition, fixer 61 includes side surface 65*a* and surface 64*b* perpendicular to side surface 65*a* inside. Side surface 65*a* fixes side surface 39*b* of holder 3 and surface 64*b* fixes surface 39 of holder 3.

Further, fixer 61 includes rectangular side surface 65*b* with rounded corners and surface 64*c* perpendicular to side surface 65*b* above side surface 65*a*. Side surface 65*b* fixes side surface 53*a* of board 5, and surface 64*c* fixes surface 53*b* of board 5.

As illustrated in FIG. 1 and FIG. 3, upper surface 64*d* of fixer 61 is in contact with surface 72 of vehicle body 7 when vehicular microphone 1 is installed in vehicle body 7. Supporter 62 includes a pair of resilient support members 62*a*. Vehicular microphone 1 is installed in vehicle body 7 by inserting vehicular microphone 1 into a hole formed on surface 72 while pressing the pair of support members 62*a* from both sides with the hand, and then releasing the hand from the pair of support members 62*a*.

Storage 63 is a space provided inside connector 6 and accommodates board 5, two electrode rods 66, and the like. Electrode rods 66 penetrate two holes 54 formed on board 5, and their ends are fixed to fourth holes 31*a* formed on the front side of bottom surface 31 of holder 3.

Note that, in the present embodiment, one microphone sensor 51 on board 5 and one first opening 34 through which sound collected by first holes 22 passes are provided, but a plurality of microphone sensors may be provided on board 5, and only one hole serving as a sound path corresponding to all may be provided.

In addition, a plurality of microphone sensors may be provided on board 5, and a plurality of holes serving as sound paths corresponding to respective microphone sensors may be provided. Providing a plurality of sound paths improves accuracy of directivity synthesis as compared with a case where only one hole serving as a sound path is provided.

Further, in the present embodiment, vehicular microphone 1 is installed in vehicle body 7 so that the bottom surface of cover 2 formed with first holes 22 is parallel to the ground as illustrated in FIG. 1, but vehicular microphone 1 may be installed in vehicle body 7 so that the bottom surface of cover 2 is perpendicular to the ground.

To be more specific, vehicular microphone 1 may be installed in vehicle body 7 such that vehicular microphone 1 illustrated in FIG. 1 is laterally positioned, a portion of first holes 22 that opens to side surface 71 of vehicle body 7 opens to the lower side of vehicle body 7, and a portion of first holes 22 that opens to the lower side of vehicle body 7 opens to side surface 71 of vehicle body 7.

This allows vehicular microphone 1 to be placed on the side surface of vehicle body 7 while achieving the effects of naturally removing water and a foreign object got into the microphone and miniaturizing the microphone, which are the same effects as those of vehicular microphone 1 illustrated in FIG. 1.

The disclosure of Japanese Patent Application No. 2023-028323, filed on Feb. 27, 2023, including the specification, drawings and abstract, is incorporated herein by reference in its entirety.

The invention claimed is:

1. A vehicular microphone, comprising:

at least one microphone sensor that detects sound;

a board that includes a first surface and a second surface, the first surface being a surface where the microphone sensor is placed, the second surface being opposite to the first surface;

a cover that includes a bottom surface and a side surface; and a connector that is electrically connectable to a cable of a vehicle, wherein, the cover is provided with at least one first hole that opens toward the bottom surface of the cover to collect the sound to be detected by the microphone sensor, and the at least one first hole is provided to open toward both the bottom surface of the cover and the side surface of the cover.

2. The vehicular microphone according to claim 1, wherein the vehicular microphone includes a portion extending in a straight line at an oblique direction to the bottom surface of the cover in a path of sound reaching the microphone sensor from the at least one first hole.

3. The vehicular microphone according to claim 1, wherein, the at least one microphone sensor includes a plurality of microphone sensors; and the plurality of microphone sensors include a first microphone sensor and a second microphone sensor placed on the first surface of the board.

4. The vehicular microphone according to claim 3, wherein the vehicular microphone is provided with a single hole that is a path of sound reaching the first microphone sensor and the second microphone sensor from the at least one first hole.

5. The vehicular microphone according to claim 3, wherein, the vehicular microphone is provided with a hole corresponding to the first microphone sensor, the hole being a path of sound reaching the first microphone sensor from the at least one first hole, and the vehicular microphone is provided with a hole corresponding to the second microphone sensor, the hole being a path of sound reaching the second microphone sensor from the at least one first hole.

6. A vehicular microphone, comprising:

at least one microphone sensor that detects sound;

a board that includes a first surface and a second surface, the first surface being a surface where the microphone sensor is placed, the second surface being opposite to the first surface;

a cover that includes a bottom surface and a side surface;

a connector that is electrically connectable to a cable of a vehicle; and a holder that holds the board, wherein, the cover is provided with at least one first hole that opens toward the bottom surface of the cover to collect the sound to be detected by the microphone sensor, the holder includes a protrusion that protrudes on a side where the board is placed, the protrusion of the holder is formed around a first opening through which the sound collected by the at least one first hole passes, and the protrusion of the holder is pressed and deformed by pressure from the board when the board is held by the holder.

7. The vehicular microphone according to claim 6, further comprising a waterproof film between the protrusion of the holder and the board, the waterproof film being provided with a second hole through which the sound collected by the at least one first hole passes.

8. The vehicular microphone according to claim 7, wherein the holder is configured by an elastic body.

9. The vehicular microphone according to claim 8, wherein, the board is further provided with a third hole that communicates with the second hole of the waterproof film, and the microphone sensor is placed on the third hole of the board.

10. The vehicular microphone according to claim 9, wherein, the connector includes a fixer that is fixed to an end of the cover, and the microphone sensor, the board, the waterproof film, and the holder are accommodated by the cover and the connector.

11. A vehicle, comprising the vehicular microphone according to claim 1 or claim 6, wherein the vehicular microphone is placed so that the at least one first hole opens toward a lower side of a body of the vehicle.

12. A vehicle, comprising the vehicular microphone according to claim 1 or claim 6, wherein the vehicular microphone is placed so that the at least one first hole opens toward a lower side and a side surface of a body of the vehicle.

13. A vehicle, comprising the vehicular microphone according to claim 1 or claim 6, wherein the vehicular microphone is placed so that the bottom surface of the cover is placed perpendicular to ground.

* * * * *